No. 663,359. Patented Dec. 4, 1900.
P. PANOULIAS.
DIPPING FRAME FOR COATING CANDIES.
(Application filed Mar. 22, 1900.)
(No Model.) 2 Sheets—Sheet 1.
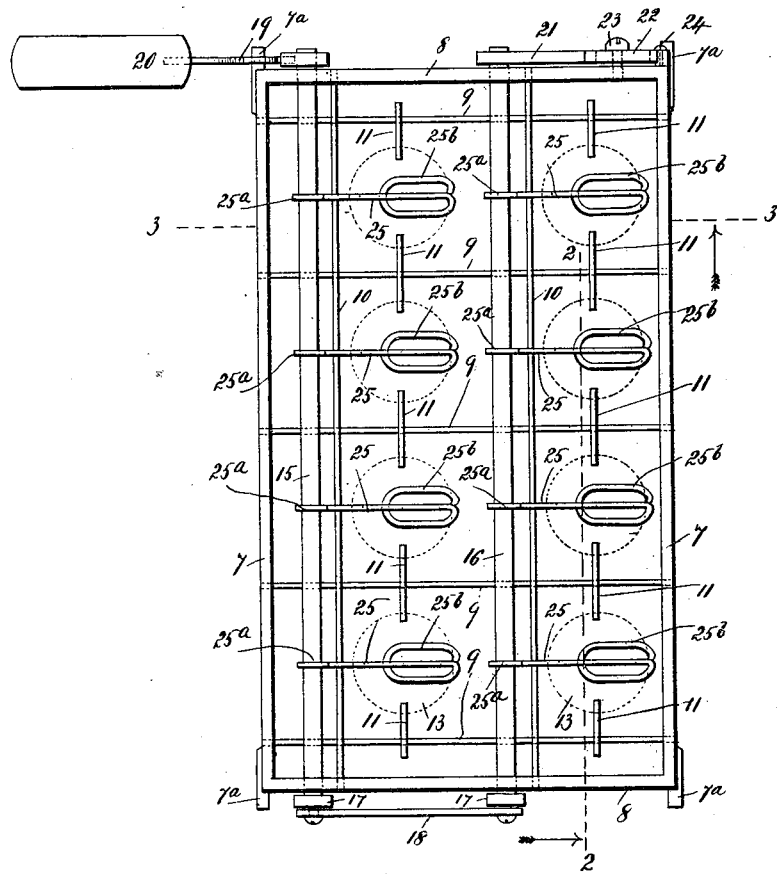
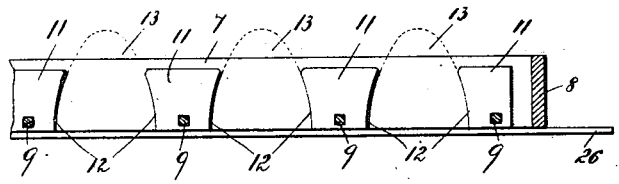

No. 663,359. Patented Dec. 4, 1900.
P. PANOULIAS.
DIPPING FRAME FOR COATING CANDIES.
(Application filed Mar. 22, 1900.)
(No Model.) 2 Sheets—Sheet 2.
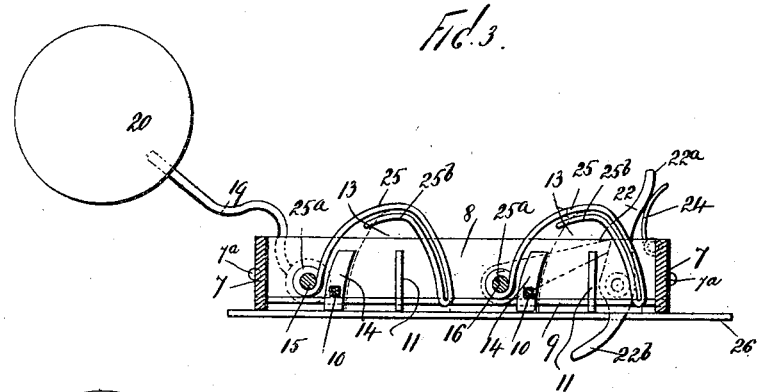
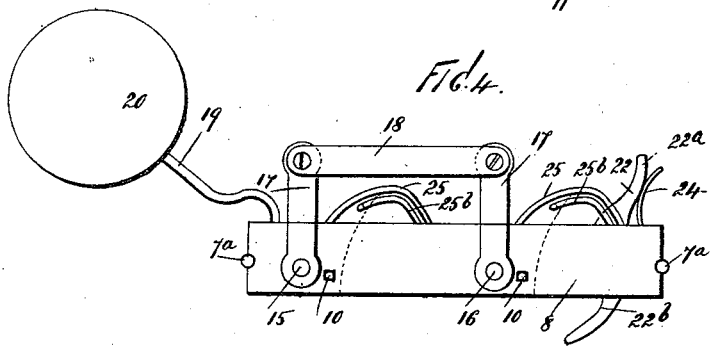
Witnesses
Panayiotis Panoulias
Inventor
By Edgar Tate & Co.
Attorneys

UNITED STATES PATENT OFFICE.

PANAYIOTIS PANOULIAS, OF NEW YORK, N. Y.

DIPPING-FRAME FOR COATING CANDIES.

SPECIFICATION forming part of Letters Patent No. 663,359, dated December 4, 1900.

Application filed March 22, 1900. Serial No. 9,639. (No model.)

*To all whom it may concern:*

Be it known that I, PANAYIOTIS PANOULIAS, a subject of the King of Greece, residing at New York, in the county of New York and State of New York, have invented certain new and useful Improvements in Dipping-Frames for Coating Candies, of which the following is a full and complete specification, such as will enable those skilled in the art to which it appertains to make and use the same.

This invention relates to dipping-frames for coating candies, and more particularly chocolates; and the object thereof is to provide an improved dipping-frame of this class in which the candies or cores thereof are immersed in liquid chocolate or other material and are thus coated.

A particular object of the present invention is to provide a dipping-frame of the class described with devices whereby the coated candies are marked to simulate the conformation of hand-dipped candies.

The dipping-frame is adapted for either manual or mechanical operation.

My invention consists in the novel construction and arrangement of parts hereinafter set forth.

In the accompanying drawings, forming part of this specification, in which like reference characters denote corresponding parts in the several views, Figure 1 is a plan view of a dipping-frame constructed according to my invention; Fig. 2, a partial longitudinal section thereof upon the line 2 2 of Fig. 1; Fig. 3, a transverse section thereof upon the line 3 3 of Fig. 1; Fig. 4, an end view thereof; and Figs. 5 and 6 are, respectively, front and side views of a complete chocolate drop the coating of which has been applied by means of the improved dipping-frame comprising the present invention. Figs. 2 and 3 represent, respectively, the portions of Fig. 1 visible when viewed in the direction indicated by the arrows respectively arranged adjacent the section-lines.

In the practice of my invention I provide an angular open frame having sides 7 and ends 8 and provided with a plurality of longitudinal spaced wires 10 and a plurality of transverse spaced wires 9, arranged in a slightly lower plane. The frame is provided at its sides with trunnions $7^a$, whereby it may be pivotally supported at each side.

Arranged upon the wires 9 are two longitudinal and parallel series of pocket-plates 11, the inner edges 12 of the endmost pair of which in each series are curved, both edges 12 of the remaining plates being curved, whereby the adjacent edges of any two plates in the series form a curved seat for the candy core or drop, as clearly shown in Fig. 2, in which the candy-cores are shown in dotted lines at 13.

Arranged upon the wires 10 in positions alternating longitudinally of the frame with the plates 11 are two series of supplemental pocket-plates 14. (Shown in full lines in Fig. 3.) The plates 14 are so arranged that each thereof and two of the plates 11 constitute a pocket for one of the candy-cores, and the edge of each thereof next adjacent the two plates 11 constituting therewith one of the pockets above referred to is curved similarly to each of the plates 11 fitting the side of one of the candy-cores, as clearly shown in Fig. 3, in which the several cores are shown in dotted lines at 13.

Arranged longitudinally of the frame, being journaled in the ends 8 thereof, are a pair of parallel shafts 15 and 16, respectively, each of which is arranged adjacent one of the wires 10. Each of the shafts 15 and 16 is provided at and exterior of one end of the frame with a fixed arm 17, which arms are connected at their upper ends by a toggle-lever 18, whereby the movement of one of the said shafts similarly and synchronously moves the other. The shaft 15 is provided at the end opposite the arm 17 with a fixed arm 19, carrying a weight 20 at its outer end. The corresponding end of the shaft 16 is provided with a fixed catch 21, (shown in full lines in Fig. 1 and in dotted lines in Fig. 3,) and pivoted to the adjacent end 8 of the frame at 23 is a dog 22, against which bears a spring 24, secured to the end of the frame and whereby the dog 22 is maintained in engagement with the catch 21, retaining the latter in depressed position, as shown in the drawings, whereby the shafts 15 and 16 are maintained in a predetermined position and whereby the weight 20 assumes the elevated position shown in the drawings. The dog 22 is provided with an upper finger-piece 22ª, whereby it may be manually operated at the proper phase of manipulation of the dipping-frame, and with a lower finger 22ᵇ, whereby it may be mechanically operated by a suitable member of the machine, of which the present dipping-frame may constitute a part.

Fixed to each of the shafts 15 and 16 in transverse alinement with the plates 14 are a plurality of guard-fingers 25, each of which consists, preferably, as shown in the drawings, of a single curved length of wire, which is connected with the respective shaft at its inner end at 25ª and formed into a broad oval loop 25ᵇ at its outer end. The curve of each of the fingers 25 is formed to fit the dome or smaller end of the candy-core in the case of chocolate drops. The fingers 25 are so arranged upon the shafts 15 and 16 that when in depressed positions the outer ends thereof occupy positions opposite the plates 14 in the respective pockets or bunches of plates completing the four-membered pockets, each of which embraces two of the plates 11, one of the plates 14, and one of the fingers 25 or loops 25ᵇ thereof, which loops are arranged in the same planes as the main portions of the respective fingers.

It is of course manifest that the conformation of each of the fingers 25 and the plates 11 and 14 may be altered to suit the requirements of the class of work to be performed and the shape of the candy cores or drops. The present form and arrangement are adapted to use in connection with the cores of chocolate drops, which are shown in dotted lines at 13 in the several figures.

The dipping-frame is shown inverted in the several figures or in the position it assumes when the coated candies are about to be discharged therefrom upon a table or ledge 26, and when the frame is being dipped the domes of the chocolate drops rest upon the fingers 25 and the sides thereof rest in engagement with the several pocket-plates 11 and 14. Previous to discharging the coated drops from the dipping-frame and with the parts in the positions shown in the drawings the dog 22 is freed from the catch 21 by means of the finger-piece 22ª or the finger 22ᵇ, and the shafts 15 and 16 are rotated in the same direction by the weight 20 raising the fingers 25, causing the looped portions 25ᵇ thereof to engage the still moist and mobile coating of the core, a portion of which is drawn up from one side of the candy, which is shown in full lines at 13ª in Figs. 5 and 6, leaving a ridge 13ᵇ upon the same side, and the portion so drawn up flows down upon the opposite side of the candy, forming a similar ridge 13ᶜ. The ridges 13ᵇ and 13ᶜ simulate the ridges formed upon the coated candies by the drip of the mobile coating when the same are manually dipped and then suspended for hardening with the crown in the lowermost position.

I do not limit myself to the specific construction and arrangement of parts herein described, but reserve the right to vary the same within the scope of my invention.

Having fully described my invention, I claim as new and desire to secure by Letters Patent—

1. A dipping-frame of the class described, embodying a pocket in which the core or candy is carried during the dipping operation, said pocket being provided with a movable member formed to mark the coated candy-core by rearranging a portion of the coating thereof and means for operating said movable member, substantially as shown and described.

2. A dipping-frame of the class described, provided with means for supporting the candy-cores and with relatively-movable means for rearranging a portion of the coating thereof, whereby the complete candies are marked to simulate a drip formation of the coating thereof, substantially as shown and described.

3. A dipping-frame of the class described, provided with means for supporting the candy-cores, and with a loop-shaped movable device for rearranging a portion of the coating thereof, whereby the complete candies are marked to simulate a drip formation of the coating thereof, substantially as shown and described.

4. A dipping-frame of the class described, provided with pockets embodying spaced plates the edges of which are formed to fit the contour of the candy-cores, and a movable member formed to rearrange a portion of the coating thereof, whereby the complete candies are marked to simulate a drip formation of the coating thereof, substantially as shown and described.

5. A dipping-frame of the class described, comprising side and end members, and cross wires or members, and pockets embodying fixed devices mounted upon said cross-wires, and movable devices which operate in connection with said fixed devices, substantially as shown and described.

6. A dipping-frame of the class described, embodying a pocket in which the candy-core is seated, said pocket comprising fixed means for supporting the core at a plurality of points, and movable means for supporting the same at another point, said movable means being formed to mark the drop to simulate a drip formation of the coating thereof, substantially as shown and described.

7. A dipping-frame of the class described, embodying fixed means for supporting the candy-cores, a rotatable shaft provided with a plurality of movable devices for supporting the candy-cores, means for actuating said shaft, and means for locking said shaft against rotation, substantially as shown and described.

8. A dipping-frame of the class described, embodying fixed means for supporting the candy-cores, a plurality of operatively-connected rotatable shafts provided each with a plurality of movable devices for supporting the candy-cores and for marking the same, means for actuating said shafts, and means for locking said shafts against rotation, substantially as shown and described.

9. A dipping-frame of the class described, provided with means for supporting the candy-cores and with a device for marking the dipped cores, consisting of a curved length of wire, one end of which is formed into a loop, and means connected with the other end of said wire for operating the same, substantially as shown and described.

In testimony that I claim the foregoing as my invention I have signed my name, in presence of the subscribing witnesses, this 19th day of March, 1900.

PANAYIOTIS PANOULIAS.

Witnesses:
F. A. STEWART,
V. M. VOSLER.